Aug. 25, 1931.  P. SUTER  1,820,404
ROTARY ELECTRIC MACHINE HAVING VENTILATION FEATURES
Filed May 13, 1926
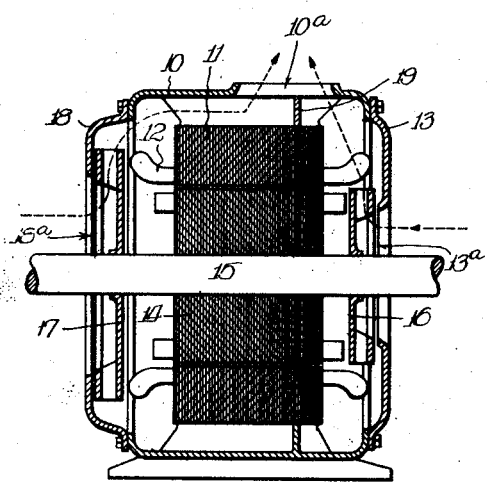
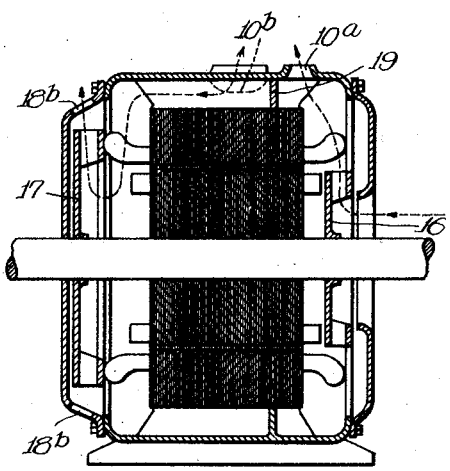
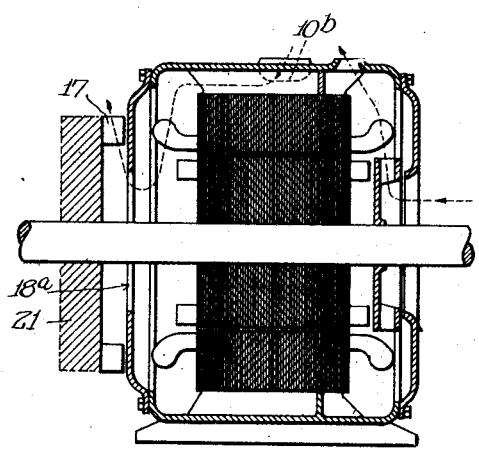
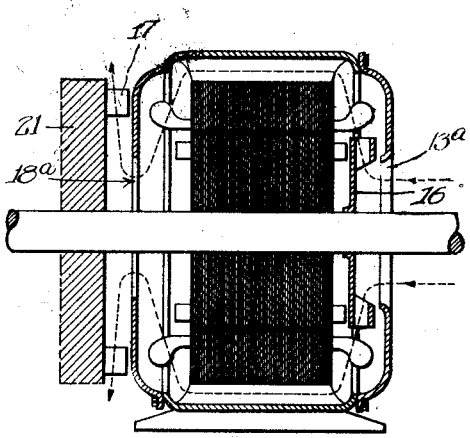
Inventor:
Philipp Suter, Patented Aug. 25, 1931

1,820,404

UNITED STATES PATENT OFFICE

PHILIPP SUTER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

ROTARY ELECTRIC MACHINE HAVING VENTILATION FEATURES

Application filed May 13, 1926, Serial No. 108,762, and in Germany June 18, 1925.

This invention relates to the construction of rotating electric machines, such as motors, generators and the like, in which air circulation for cooling is accomplished by fans carried on the rotor or rotor shaft.

The general object is the provision of a construction which may be assembled with convenience and which will effect the circulation of air in adequate volume and properly distributed to exercise the desired cooling ventilation.

One of the specific objects is the provision of a construction which will permit the complete assembling of the fan or fans on the rotor shaft before the latter is positioned in the frame of the machine.

Other objects will be pointed out or indicated hereinafter or obvious to one skilled in the art upon an understanding of the invention.

In the drawings forming a part of this specification I show various forms in which the invention may be embodied in electric motors, but it is to be understood that the invention claimed is not to be construed as limited to use in motors or to the particular constructions illustrated.

In the drawings,

Fig. 1 is a sectional elevation of a motor, taken on an axial line, the parts being illustrated in diagrammatic fashion.

Figs. 2, 3 and 4 are similar diagrammatic sectional elevations of various modified arrangements.

The size, and consequently the power, of the fans that can be utilized in rotary electric machines, such as motors having a single piece stator frame, is limited by the condition that at least one of the fans must be of sufficiently small diameter to pass through the stator tunnel, it being desirable that the assembly on the rotor shaft be complete before it is assembled with the frame. By the present invention I am able to secure both the desired convenience of assembly and the requisite volume of air circulation and ventilation by the use of two fans, one of which need not be passed through the frame tunnel, cooperating in such fashion as to effect the proper distribution of cooling air to the machine parts. The nature of the invention may be most quickly ascertained by reference to the illustrative embodiments, of which four are shown. In the form illustrated in Fig. 1, the motor frame is designated 10, and includes the casing which houses the field poles 11 and windings 12, the arrangement being such that air channels or passages are afforded between these portions and the casing. The interior diameter of the field elements accommodates the rotor 14 which is carried on the rotor shaft 15, supported in bearings outside the frame in a customary manner. At one end of the rotor the shaft carries the fan 16, the same being of the centrifugal type and of such diameter as to permit its passage through the central tunnel of the field assembly. This fan is positioned near the end plate or frame 13 in front of the axial opening 13$^a$ thereof. At the other end of the rotor, the shaft carries a larger fan 17, also of the centrifugal type, the same having a position inside the end plate or frame closure 18 in front of the axial opening 18$^a$. In accordance with the relative capacities of the fans 16 and 17, the length of the casing is subdivided by a partition 19, extending between the field pieces and the casing, into two compartments, one on the side of the smaller fan 16 and one on the side of the larger fan 17. These compartments have outlet openings 10$^a$ in the frame casing, distributed at suitable points about the same. In the operation of the motor, the fans 16 and 17 draw air into the casing, through the respective openings 13$^a$ and 18$^a$, and deliver it radially so that it is circulated over and around the portions of the field elements exposed in their respective compartments. As the area of surface to be cooled in the respective compartments bears a relationship to the delivery volume of the respective fans, there is obtained the result that the surfaces are cooled to approximately a uniform degree throughout the length of the field members, the fans cooperating to attain this result.

In the form illustrated in Fig. 2, the fans and compartments are similarly arranged, but in this case the end frame alongside the larger fan 17 is closed at the eye portion and has circumferentially-arranged air outlet openings 18$^b$. Consequently, the fan draws air through the circumferential openings 10$^b$ of the frame casing and expels it through the openings 18$^b$, subjecting the field elements to its influence. The fan 16 operates as in the arrangement shown in Fig. 1. The openings 10$^b$ should be displaced circumferentially with respect to the openings 10$^a$ so that the warm air expelled through the latter will not be drawn back into the casing through the former.

In the arrangement shown in Fig. 3 the fan 16 operates as described above, while the large fan is carried on an element 21, such as a pulley or disk, mounted externally of the motor frame and adjacent the end frame, which has the eye opening 18$^a$ as in the first instance. The large fan consequently draws air in through the openings 10$^b$ and out through the opening 18$^a$.

In the form shown in Fig. 4, the large fan is arranged as in Fig. 3, but the casing is not partitioned. Consequently, the small fan draws air in through the eye opening 13$^a$ and the large fan draws it out through the eye opening 18$^a$, subjecting the field elements to its cooling influence as it passes across their surfaces.

What I claim is:—

1. In a dynamo-electric machine comprising a stator, a rotor, and an enclosing casing, a shaft for said rotor, a fan affixed on said shaft in juxtaposition with one end of said rotor and of diameter not greater than the diameter of said rotor, a second fan affixed to said shaft in juxtaposition with the opposite end of said rotor and of diameter greater than the diameter of said rotor, a partition subdividing the said casing into two compartments commensurate with the relative capacities of the two fans, each said compartment being provided with an inlet and an outlet to permit the flow of a cooling fluid therethrough responsive to actuation of one of the said fans.

2. In a dynamo-electric machine comprising a stator, a rotor adapted for actuation within said stator, and an enclosing casing divided into two compartments, a shaft for said rotor, a fan affixed to said shaft in juxtaposition with one end of said rotor and of diameter not greater than the diameter of the said rotor, a second fan affixed to the said shaft in juxtaposition with the opposite end of the said rotor and of diameter greater than the diameter of the said rotor, the said compartments being of unequal capacities and each relatively commensurate with the capacities of the said fans, said casing being provided with an inlet and an outlet for each said compartment so arranged as to permit the flow of cooling fluid through one of said compartments in direction towards the center of said stator responsive to actuation of one of the said fans, and the flow of cooling fluid through the other of said compartments towards one end of said stator responsive to the actuation of the other of said fans.

PHILIPP SUTER.